United States Patent [19]

Lyman

[11] 4,195,827

[45] Apr. 1, 1980

[54] CONDUIT CUTTER

[76] Inventor: Richard G. Lyman, 408 E. 230th St., Carson, Calif. 90745

[21] Appl. No.: 34,621

[22] Filed: Apr. 30, 1979

[51] Int. Cl.² ............................................... B25B 7/02
[52] U.S. Cl. ......................................... 269/2; 269/6; 269/87.2; 269/288
[58] Field of Search ...................... 269/2, 6, 87.2, 295, 269/275, 288; 83/744, 745, 454, 455

[56] References Cited

U.S. PATENT DOCUMENTS

| | | | |
|---|---|---|---|
| 2,071,273 | 2/1937 | Paterson | 269/87.2 |
| 2,107,635 | 2/1938 | Junkermann | 269/87.2 |
| 2,111,468 | 3/1938 | Corkum | 269/2 |
| 3,582,060 | 6/1971 | Carter | 269/2 |

*Primary Examiner*—Robert C. Watson
*Attorney, Agent, or Firm*—William C. Babcock

[57] ABSTRACT

Set out herein is an improved conduit cutting guide including a longitudinally hinged handle formed in the manner of a trough and lined with segments of rubber or plastic for grasping the surfaces of a spirally wound flexible conduit therein. One end of the handle is attached to a first set of J-shaped end plates, each end plate being respectively fixed to one of the hinged portions of the handle, the first set of end plates extending above the handle trough to form two outwardly and downwardly directed end tabs. A second set of J-shaped end plates is attached to the respective first set, the second end plates being similarly conformed in plan form and include an offset for receiving the hacksaw blade therebetween. Thus, a conduit may be placed into the interior of the hinged handle and may be grasped thereat by the user. A hacksaw is then insertable into the space between the first and second sets of end plates for cutting the conduit.

4 Claims, 7 Drawing Figures

CONDUIT CUTTER

BACKGROUND OF THE INVENTION

1. Field of the Invention

The present invention relates to clamps or gripping tools and more particularly to tools for grasping conduits during the course of cutting.

2. Description of the Prior Art

In my prior U.S. Pat. No. 3,965,571 I have set out a conduit cutting device provided with a longitudinal cavity in which a section of the flexible conduit may be laid. Since that time I have desired improvements to such cutting guide, improvements which are particularly useful in adapting the use thereof with conduits of various dimensions and which furthermore securely retained a hacksaw in cutting alignment.

SUMMARY OF THE INVENTION

Accordingly, it is the general purpose and object of the present invention to provide an improved conduit cutting guide which by virtue of its construction will be useful with conduits of various sectional dimensions.

Other objects of the invention are to provide improvements in a conduit cutter which in its features include safety provisions against inadvertent escape of a hacksaw blade.

Yet additional objects of the invention are to provide an improved conduit cutter which is easy to produce, convenient in use, and requires few parts.

Briefly, these and other objects are accomplished within the present invention by providing a conduit cutting guide comprising an elongate handle conformed as a semicircular channel split longitudinally and hinged to pivot in a clam-shell manner, the hinged portions of the handle having attached to the interior surfaces thereof, flexible liners for grasping the exterior surfaces of the conduit. One end of the handle is secured to a first set of J-shaped end plates which on their interior peripheries mate with the interior surface of the handle and which join at the hinge plane thereof. A second set of J-shaped end plates is attached to the first set proximate the bottom thereof, the second set including a longitudinal offset for forming a gap therewith. The free ends of the first set of the end plates are turned over and downwardly over the ends of the second set, the ends of the second set being disposed subjacent thereto in an outwardly inclined alignment. Thus a gap is formed through which the blade of a hacksaw can be transferred over the top of the second set of end plates to cut any flexible conduit grasped between the handle portions. The result is a substantially transverse cut across the conduit axis which can be achieved in conduits of varying sizes.

DESCRIPTION OF THE SPECIFIC EMBODIMENT

Figure 1:
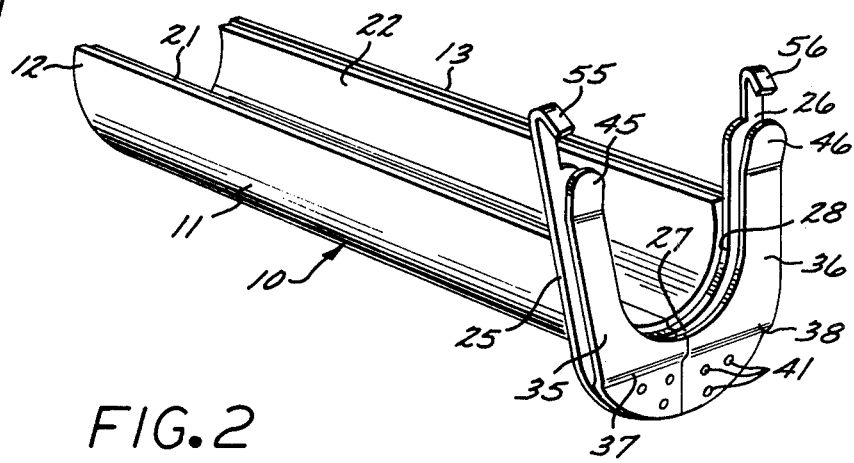
FIG. 1 is a perspective view of a guide for cutting flexible conduit constructed according to the invention herein.
Figure 2:
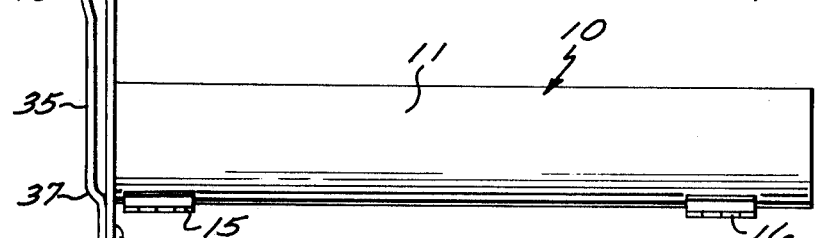
FIG. 2 is a side view of the guide shown in FIG. 1.
Figure 3:
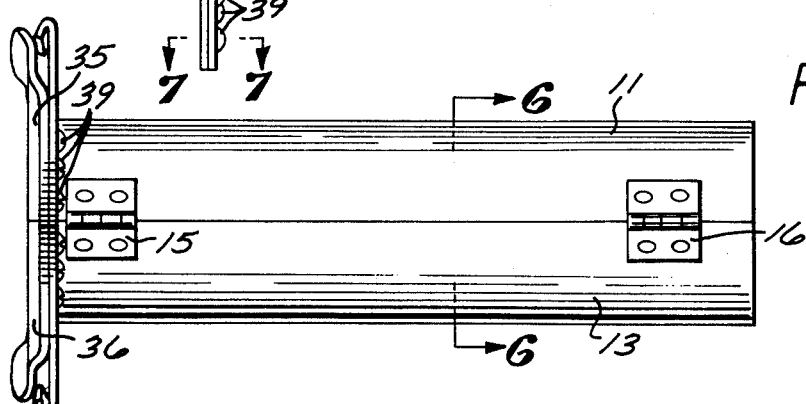
FIG. 3 is a bottom view of the guide shown in FIG. 2, illustrating the manner of hinging thereof.

As shown in FIGS. 1-5, the inventive conduit cutting implement, generally designated by the numeral 10, comprises an elongate handle 11 formed as a semi-circular surface or channel out of two handle portions 12 and 13 hinged along one longitudinal edge by a fore and aft hinge 15 and 16 respectively. In this form the two circular segments may be pivoted relative each other in a manner of a clam shell defining an interior cavity therebetween into which a conduit may be placed. In order to grasp the periphery of the conduit the interior surfaces of portions 12 and 13 are lined with a flexible liner 21 and 22 respectively made out of material structure like rubber which when forced against the exterior surfaces of the conduit to be cut will oppose any rotation thereof. Thus conduits of the flexible type normally wound as a spiral may be placed on the flexible surfaces 21 and 22, the user then manually grasping the handle 11 to compress the conduit therebetween. One end of the handle 11 then forms a reference plane across which a cut can be made to ensure a substantially orthogonal cut to the axis of the conduit.

In order to further assist the cutting effort the forward end of the handle 11 and particularly the transverse edges of the surface portions 12 and 13 are attached to two J-shaped first end plates 25 and 26 respectively. More specifically, J-shaped first end plate 25 includes an interior edge 27 which follows the interior surface of portion 12 and is aligned therewith. Similarly end plate 26 has an interior edge 28 conformed to align with the edge of portion 13. The foregoing end plates 25 and 26 may be attached to the end of the handle 11 in any conventional manner, it being contemplated herein to form the attaching structure by way of welding. In this form the J-shaped end plates extend beyond the exterior of handle 11 to form an attaching structure to which a second set of end plates may be affixed. More specifically, shown herein is a second set of end plates 35 and 36 generally conformed to define the same aperture as that defined by end plates 25 and 26 and including a surface offset therein for the insertion of a hacksaw blade. Thus plate 35 may be attached to plate 25 by way of a plurality of bolts or screws 39 joining the segments thereof which extend radially beyond the exterior of handle 11. From this attachment point the plate 35 is convolved across a step 37 to extend in a spaced relationship over the adjacent surface of end plate 25. It is this spaced relationship that forms the foregoing gap for receiving the hacksaw blade. Similarly plate 36 may include an offset convolution 38 beyond which it is fastened to the subjacent portions of plate 26 by screws 41. In the foregoing arrangement it is contemplated to provide a substantially orthogonal edge to the handle 11, thus aligning end plates 25, 26, 35 and 36 in a plane substantially normal to the axis of any conduit received therebetween. The end plate, being fixed to the respective handle portions, will thus be hingedly articulated therewith to closely surround the conduit edge which is to be cut. In order to accommodate the insertion of the hacksaw blade into the spaced gap between the first and second set of end plates, it is contemplated to bend outwardly the free ends of end plates 35 and 36 as shown by the outward alignment of end segments 45 and 46. End plates 25 and 26, on the other hand, may include end tabs 55 and 56 at the free ends thereof which are bent over and downwardly over the gap set out hereinabove to oppose any inadvertent withdrawal of the hacksaw blade. Thus the substantially large cutting forces entailed in severing a flexible conduit are rendered safe by the geometry of the end segments of plates 25, 26, 35 and 36. To further facilitate the cutting operation end plate 35 may be adjustable relative the end plate 25 as well as end plates 36 being adjustable relative end plate 26.

Figure 7:
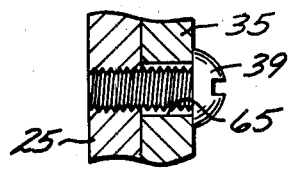
FIG. 7 is a detail view taken along line 7—7 of FIG. 3.

More specifically, this adjustment features is illustrated in FIG. 7. As shown in this figure, the reference being exemplary to all of the end plates by way of the description of screw 39, end plate 35 includes an enlarged opening 65 and thus may be adjusted in the alignment thereof over plate 25. In this manner a larger opening may be defined between the interior edges formed by end plates 35 and 36 and the opening formed by the interior edges 27 and 28. Thus any conduit which may be possible grasped by the edges of end plates 25 and 26 will not be engaged by the plates 35 and 36 avoiding any possibility of blades binding or crimping of metal.

Figures 4, 5:
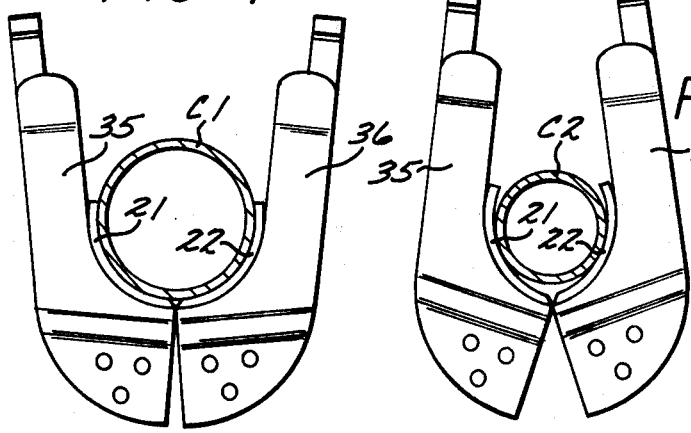
FIG. 4 is an end view of the guide disclosed herein, expanded to receive a large diameter conduit.
FIG. 5 is yet another end view of the guide illustrated to receive a small diameter conduit.
Figure 6:
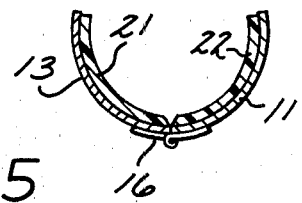
FIG. 6 is a sectional view taken along line 6—6 of FIG. 4.

The foregoing structure, as illustrated in FIGS. 4, 5 and 6, is particularly suited to adapt to conduits of various dimensions. More specifically as shown in FIG. 4 the large sized conduits C-1 is received on the interior of handle 11 being compressed therein by the flexible or compressive liners 21 and 22. The same handle structure, according to the illustration in FIG. 5, may receive a smaller sized conduit C-2, the cutting plane in each instance being defined by the spaced relationship between end plate 25 and 26 and 35 and 36. Thus by virtue of the hinged arrangement, as illustrated in FIG. 6, conduits of most sizes may be received for cutting. In each instance the grafting surface defined by liners 21 and 22, is in hand, opposing any rotation of the conduits which in case of spiral windings often produces blade bind.

Obviously many modifications and changes can be made to the foregoing description without departing from the spirit of the invention. It is therefore intended that the scope of the invention be determined solely on the claims appended hereto.

What is claimed is:

1. Apparatus for guiding the cutting of flexible conduit by way of a saw comprising:
    a handle conformed as a hollow semicircular segment having two longitudinally hinged portions aligned to pivot relative each other for defining cavity of varying lateral dimensions therebetween into which said conduit may be placed;
    flexible lining means adhesively secured on the interior of said cavity to the interior surfaces thereof;
    a first set of substantially J-shaped end plates respectively secured to one end of said portions in a plane substantially orthogonal to said cavity, said first set of J-shaped end plates being conformed to define an opening therebetween substantially equal to the end of said cavity; and
    a second set of J-shaped end plates attached in spaced relationship over said first set of end plates to define a gap therebetween.

2. Apparatus according to claim 1 wherein said first set of end plates include end tabs bent to extend over said gap; and
    said second set of end plates includes ends aligned outwardly from said gap.

3. Apparatus according to claim 2 wherein:
    said portions comprise surface segments of a tube.

4. Apparatus according to claim 3 wherein:
    said second set of end plates are adjustably secured to said first set of end plates.

* * * * *